United States Patent
Singh et al.

(10) Patent No.: US 11,055,427 B2
(45) Date of Patent: Jul. 6, 2021

(54) SYSTEM AND METHOD FOR A SECURED CLOUD FILE SYSTEM

(71) Applicant: University of South Florida, Tampa, FL (US)

(72) Inventors: Vivek Kumar Singh, Tampa, FL (US); Kaushik Dutta, Lutz, FL (US); Balaji Padmanabhan, Tampa, FL (US); Shalini Sasidharan, Tampa, FL (US)

(73) Assignee: University of South Florida, Tampa, FL (US)

( * ) Notice: Subject to any disclaimer, the term of this patent is extended or adjusted under 35 U.S.C. 154(b) by 394 days.

(21) Appl. No.: 16/269,998

(22) Filed: Feb. 7, 2019

(65) Prior Publication Data

US 2019/0251280 A1    Aug. 15, 2019

Related U.S. Application Data (60) Provisional application No. 62/628,367, filed on Feb. 9, 2018.

(51) Int. Cl.
*G06F 21/62* (2013.01)
*G06F 16/248* (2019.01)
(Continued)

(52) U.S. Cl.
CPC ............ *G06F 21/6218* (2013.01); *G06F 7/58* (2013.01); *G06F 16/248* (2019.01);
(Continued)

(58) Field of Classification Search
CPC ...... G06F 21/6218; G06F 16/248; G06F 7/58; G06F 21/602; H04L 9/0643; H04L 63/10; H04L 63/20
See application file for complete search history.

(56) References Cited

U.S. PATENT DOCUMENTS 9,253,166 B2 * 2/2016 Gauda ................. G06F 21/6272
10,341,304 B1 * 7/2019 Boutros ................ H04W 12/06
(Continued)

OTHER PUBLICATIONS

Ah Kioon, M. C. et al. Security Analysis of MD5 Algorithm in Password Storage. Proceedings of the 2nd International Symposium on Computer, Communication, Control and Automation (ISCCCA-13). 2013. https://doi.org/10.4028/www.scientific.net/AMM.347-350.2706.

(Continued)

*Primary Examiner* — Oleg Korsak
(74) *Attorney, Agent, or Firm* — Smith & Hopen, P.A.; Molly L. Sauter (57) ABSTRACT

A cloud security system and method designed to protect users' data in case of accidental leaks in a cloud computing environment. Secured hashing of the names of folders stored on the cloud data storage are generated and persisted using multiple iterations of cryptographic hash functions along with a concatenated random number for each of the folder names, thereby providing protection against vulnerability of the folder names. The proposed system is a dual-layer framework consisting of a control layer and a data layer. The control layer is responsible for cryptographic hashing and persistence of the folder name, hashed name, salt, and iterations in a database. The control layer communicates with the data layer and provides the hashed folder names to persist the user data cloud storage.

20 Claims, 6 Drawing Sheets

(51) Int. Cl.
H04L 9/06 (2006.01)
H04L 29/06 (2006.01)
G06F 21/60 (2013.01)
G06F 7/58 (2006.01)

(52) U.S. Cl.
CPC .......... *G06F 21/602* (2013.01); *H04L 9/0643* (2013.01); *H04L 63/10* (2013.01); *H04L 63/20* (2013.01)

(56) References Cited

U.S. PATENT DOCUMENTS

| | | | | |
|---|---|---|---|---|
| 2013/0138947 | A1* | 5/2013 | Chang | G06F 12/1408 713/150 |
| 2015/0082399 | A1* | 3/2015 | Wu | H04L 9/0897 726/6 |
| 2017/0214668 | A1* | 7/2017 | Mityagin | H04L 63/0428 |
| 2017/0364698 | A1* | 12/2017 | Goldfarb | H04L 9/3239 |
| 2017/0364699 | A1* | 12/2017 | Goldfarb | G06F 21/6227 |
| 2017/0364701 | A1* | 12/2017 | Struttmann | G06F 16/2282 |
| 2017/0366353 | A1* | 12/2017 | Struttmann | G06F 21/64 |
| 2018/0205552 | A1* | 7/2018 | Struttmann | H04L 9/0637 |
| 2018/0307857 | A1* | 10/2018 | Beecham | G06F 16/9024 |
| 2019/0288850 | A1* | 9/2019 | Beecham | G06F 21/6227 |
| 2019/0318117 | A1* | 10/2019 | Beecham | G06F 16/9024 |

OTHER PUBLICATIONS

Blue, J. et al. A novel approach for secure identity authentication in legacy database systems. 28th Irish Signals and Systems Conference, ISSC. 2017. https://doi.org/10.1109/ISSC.2017.7983624.

Boonkrong, B. et al. Dynamic salt generation and placement for secure password storing. IAENG International Journal of Computer Science, 2016, 43(1), 27-36.

Dworkin, M. J. SHA-3 Standard: Permutation-Based Hash and Extendable-Output Functions. Draft FIPS PUB 202. Aug. 2015. https://doi.org/10.6028/NIST.FIPS.202.

Gauravaram, P. Security analysis of salt||password hashes. In Proceedings—2012 International Conference on Advanced Computer Science Applications and Technologies, ACSAT 2012 (pp. 25-30). https://doi.org/10.1109/ACSAT.2012.49.

Jablon, D. P. Extended password key exchange protocols immune to dictionary attack. Journal of Engineering and Applied Science, 1997, 248-255. https://doi.org/10.1109/ENABL.1997.630822.

Jaeger, D., et al. Gathering and analyzing identity leaks for security awareness. In Lecture Notes in Computer Science. 2015, vol. 9393 LNCS, pp. 102-115. https://doi.org/10.1007/978-3-319-24192-0_7.

Loch, K. D., et al. Threats to Information Systems: Today's Reality, Yesterday's Understanding. MIS Quarterly, Jun. 1992, 16(2), 173-186. https://doi.org/10.2307/249574.

Putri Ratna, A. A., et al. Analysis and comparison of MD5 and SHA-1 algorithm implementation in Simple-O authentication based security system. In 2013 International Conference on Quality in Research, QiR 2013—In Conjunction with ICCS 2013: The 2nd International Conference on Civic Space, pp. 99-104. https://doi.org/10.1109/QiR.2013.6632545.

Teat, C. et al. The security of cryptographic hashes. ACM Annual Southeast Regional Conference, 2011, pp. 103-108. https://doi.org/10.1145/2016039.2016072.

Zheng, X., et al. Research for the application and safety of MD5 algorithm in password authentication. In Proceedings—2012 9th International Conference on Fuzzy Systems and Knowledge Discovery, FSKD 2012, pp. 2216-2219. https://doi.org/10.1109/FSKD.2012.6234010.

* cited by examiner

SYSTEM AND METHOD FOR A SECURED CLOUD FILE SYSTEM

CROSS-REFERENCE TO RELATED APPLICATIONS

This application claims priority to U.S. Provisional Patent Application No. 62/628,367, entitled "System and Method for a Secured Cloud File System", filed on Feb. 9, 2018, the contents of which are herein incorporated by reference.

BACKGROUND OF THE INVENTION

Data security and privacy in organizations is an essential business imperative. There have been numerous events of data leaks, a.k.a., "cloud leaks", reported in the news recently. These data leaks impact organizations on different dimension such as profit margin, market capitalization and brand image. For example, recent security breaches include the leaking of the data of almost 200 million voters in the United States and the leaking of personal data of approximately 6 million users of a telecommunications company, due to improper cloud security settings. The key pattern emerging in these cloud security leaks is that the majority of them are the result of human error due to inappropriate cloud security settings. Furthermore, the intensity and frequency of these risks are likely to grow with increasing cloud adoption and growing complexity of cloud services.

An investigation of the concerns of Management Information System (MIS) executives related to Information systems threats demonstrates that there is a wide gap in understanding of MIS executives between the use of a new technology and its security implications. Moreover, there is a lack of understanding of highly connected contemporary technologies among executives as they still recognize the current threats from pre-connectivity era. Apart from the lack of understanding of security related issues by top executives, there are cases related to weak implementation of industry best practices by organizations.

The key issue which leads to the data breaches described above is the current design of cloud storage services in which the name of the data storage folder is openly accessible. Therefore, in a case of accidental misconfiguration of cloud security settings (especially leaving the data public), anyone with internet access may obtain a copy of data if he or she can search and discover the name of the data storage folder.

Accordingly, what is needed in the art is a secured cloud file system that overcomes the aforementioned challenges.

However, in view of the art considered as a whole at the time the present invention was made, it was not obvious to those of ordinary skill in the field of this invention how the shortcomings of the prior art could be overcome.

BRIEF SUMMARY OF THE INVENTION

In various embodiments, the present invention provides a system and method to protect an organization's data in the case of a data leak in the cloud file system storing the data.

The present invention provides a novel secured cloud file system for cloud computing platforms that is effective in protecting users of the system against accidental data leaks. The secured cloud file system of the present invention is a dual-layer secure hashing-based file system consisting of a control layer and a data layer. The control layer maps the logical file system consisting of folder names to a secured hashed file system, along with providing persistence of both the logical file system and the secured hashed file system. The data layer provides the persistence of the physical system in the cloud environment.

In one embodiment, the present invention provides a method for providing a secured cloud file system. The method includes, providing a cloud storage gateway logically interposed between a cloud storage provider and a cloud storage user and an application programming interface (API) in communication with the cloud storage user and the cloud storage gateway. The method further includes, responsive to receiving, by the cloud storage gateway, a folder name and a request from the cloud storage user to create a folder having the folder name at the cloud storage provider, concatenating a random number to the folder name and hashing the folder name provided by the user and the concatenated random number using a predetermined number of hashing iterations to generate a hashed folder name. Hashing the folder name may be performed using a Secured Hashing Algorithm (SHA). The method additionally includes, creating a folder having the hashed folder name at the cloud storage provider and storing the folder name, the random number and the predetermined number of hashing iterations in a database.

In an additional embodiment, after the hashed folder is created at the cloud storage device, when a request from the cloud storage user to access the folder created at the cloud storage is received at the cloud storage gateway, the method includes, performing a lookup of the folder name in the relational database to obtain the random number and the predetermined number of hashing iterations and regenerating the hashed folder name from the folder name lookup, the random number and the predetermined number of hashing iterations. The regenerated hashed folder name can then be used to access the hashed folder name at the cloud storage provider. Accessing the folder may include one or more of, deleting the folder, listing the folder, accessing content of the folder, copying content of the folder to another folder, copying content of the folder to an external system.

In the present invention, the folder may be a parent folder or one or more subfolders of a parent folder. The parent folder may also be referred to as a root folder or a bucket.

In another embodiment, the present invention provides a secured cloud file system, which includes, one or more processors interposed between a cloud storage provider and a cloud storage user, a communication interface operatively coupled to the one or more processors and the cloud storage user and one or more data storage devices operatively coupled to the one or more processors. The data storage devices are operable for storing a control layer, which when executed on the one or more processors, and responsive to receiving a folder name and a request from the cloud storage user to create a folder having the folder name at the cloud storage provider, concatenates a random number to the folder name, hashes the folder name provided by the cloud storage user and the concatenated random number using a predetermined number of hashing iterations to generate a hashed folder name and stores the folder name, the random number and the predetermined number of hashing iterations in a database. The data storage devices are additionally for storing a data layer, which when executed on the one or more processors, creates a folder having the hashed folder name at the cloud storage provider.

Additionally, the stored control layer, which when executed on the one or more processors, and responsive to receiving a request from the cloud storage user to access the folder created at the cloud storage provider, performs a lookup of the folder name in the relational database to obtain the random number and the predetermined number of hashing iterations, regenerates the hashed folder name from the folder name lookup, the random number and the predetermined number of hashing iterations and uses the regenerated hashed folder name to access the hashed folder name at the cloud storage provider.

The present invention also provides a non-transitory computer-readable storage media embodying a set of instructions, which when executed by one or more processors of a cloud storage gateway logically interposed between a cloud storage provider and a cloud storage user, cause the one or more processors to perform a method. The method includes, providing an interface between the cloud storage gateway and the cloud storage user. The method further includes, responsive to receiving, by the cloud storage gateway, a folder name and a request from the cloud storage user to create a folder having the folder name at the cloud storage provider, concatenating a random number to the folder name and hashing the folder name provided by the user and the concatenated random number using a predetermined number of hashing iterations to generate a hashed folder name. The method also includes, creating a folder having the hashed folder name at the cloud storage provider and storing the folder name, the random number and the predetermined number of hashing iterations in a database.

The non-transitory computer-readable storage medium of the present invention may further store instructions to implement a method wherein, responsive to receiving, by the cloud storage gateway, a request from the cloud storage user to access the folder created at the cloud storage provider, performing a lookup of the folder name in the relational database to obtain the random number and the predetermined number of hashing iterations and regenerating the hashed folder name from the folder name lookup, the random number and the predetermined number of hashing iterations. The method may further include using the regenerated hashed folder name to access the hashed folder name at the cloud storage provider.

In various embodiments, the secure cloud file system of the present invention applies cryptographic hashing techniques to mask the identity of cloud storage folders in the case of accidental data leaks. The framework can be widely adopted by organizations providing Storage-as-a-Service (SaaS) and cloud computing storage services.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In various embodiments, the present invention provides a novel IT framework and a secured cloud file system artifact to reduce the likelihood of discovery of confidential data leaks in the case of accidental exposure of sensitive cloud storage data.

In the following description, numerous specific details are set forth in order to provide a thorough understanding of the embodiments of the present disclosure. It will be apparent, however, to one skilled in the art that embodiments of the present disclosure may be practiced without some of these specific details. In some, well-known structures and devices are shown in block diagram form.

Embodiment of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly including instructions, which may be used to program a computer or other electronic device to perform a process. The medium may include, but is not necessarily limited to, hard drives, magnetic tap, optical disks, read-only memories, programmable read-only memories, random access memories, flash memory and various other forms of media suitable for storing electronic instructions. Additionally, embodiments of the present invention may also be downloaded as one or more computer program products, wherein the program may be transferred from a remote computer to a requesting computer by way of transient signals via a communication link.

An apparatus for practicing various embodiments of the present invention may include one or more computers or processors and data storage systems containing or having access to computer programs coded in accordance with the various methods of performing the invention described herein, wherein the method steps can be accomplished using modules, routines, subroutines or subparts of a computer program product.

Cloud storage providers offer Software-as-a-Service (SaaS) based storage services to cloud storage users, over the Internet. The cloud storage providers offer storage for structured, semi-structured and unstructured data. For structured data, traditional relational databases are offered as-a service. For semi-structured data, recent key-value pair based databases are offered as-a service. In the present invention, the focus is on the unstructured data storage, which is commonly offered as a file-based system storage.

Amazon Web Service (AWS), a leading cloud storage provider, provides storage services, known as Simple Storage Service or S3, which allows users to store both unstructured and structured data. Other major public cloud storage providers, such as Microsoft Azure, also provide similar services. The unstructured data storage service over the cloud allows users to create data folders, similar to folders on personal computers, and allows users to store their content as files and subfolders within the parent folder or root folder. The parent folder, or root folder, is a folder which does not have a parent folder itself.

In AWS S3 service, it is required that the name of the parent folder be unique, across all users. However, this constraint may result in the undesirable leak of the names of data folders to malicious agents. The cloud storage users store data in a hierarchical structure of folders, which may contain either files or subfolders. The root folder, or the folder without any parent folder, is termed as "Bucket". AWS requires unique bucket names across all the users. Moreover, users can specify the security access settings for their buckets, and/or folders within their buckets, to be private or public, depending upon their business requirements.

To demonstrate this issue, an exemplary S3 folder name "testbucket-123-986" with private security setting is described, which is the default setting. In the case of private security settings, individuals without permission to the folder cannot access the data. Further, a text file, such as "confidential.txt", is described as being included in the folder. Users can access the folders using folder URI, over the Internet. For example, the exemplary folder can be accessed using "https://testbucket-123-986.s3.us-east-2.amazonaws.com". If the user trying to access the folder has not being given permission to access the folder, then an error message will be returned to the user such as, "Access Denied".

Additionally, when a user attempts to access a folder which does not exist on the platform, such as https://testbucket-123-986-doesnotexist.s3.us-east-2.amazonaws.com, the system will return an error message to the user such as. "The specified bucket does not exist".

As can be observed from the returned error messages described above, any malicious agent can easily trace if a folder with a specific name of interest exists on the cloud platform or not. Further, if the security setting of the private folder is set to public, the data within the folder is accessible over the internet and the malicious agents with the folder name can easily access the data.

Further, by performing a simple search for cloud folder names with the name of companies listed in S&P 100, as presented in Table 1 below, which are existing on the cloud platform. While it cannot be confirmed if these folders indeed belong to these organizations, however, a similar simple search may reveal the names of any folders and verify if the folder exists on the platform.

There are existing encryption-based file systems provided to consumers by various organizations for encrypting data on user devices, such as laptops and desktops. Such secured file systems are useful to protect users from unauthorized access to the physical device. Moreover, these secured file systems use symmetric-key based encryption techniques to encrypt the data. The legitimate user (s) have access to the key which they can use to decrypt the data. However, there are multiple challenges in adopting such systems for the cloud file system security. First, organizations using cloud storage mostly operate in a multiuser environment in which the private key must be shared with multiple individuals in the organization, which is a security weakness. Second, the key, which is most likely stored in the cloud environment, may be accidently leaked along with the data, which makes the security of data vulnerable. Third, in the case of changes to the user policies for data access, a separate key must be generated and distributed to the existing users of the system. Finally, there is an existing user based policy management service provided by the cloud providers to maintain the access to respective files.

The folders containing sensitive information, which are publicly exposed, pose a grave threat to their organizations. Moreover, the private folders' names are also discoverable which further weakens the security of data in case of accidental change of privacy settings of the bucket from private to public. There have been a growing number of malicious agents, a.k.a., bucket finders, that search for organizations' publicly exposed S3 buckets with sensitive information. Once an organizations' bucket is publicly exposed, bucket finders can discover them using dictionary-based attacks, in which the malicious agent searches for names similar to the name of the target organization using the cloud access APIs. Moreover, malicious agents may also discover the private buckets, however, the data in the private buckets is not accessible. However, this exposure of names of private buckets further weakens the security of the storage service by providing a point of attack for the malicious agents.

To answer the above research challenge, the present invention provides a novel framework and algorithms to help organizations reduce the risk of accidental cloud storage folder exposure in the public domain. Moreover, the inventive framework also protects the private buckets from discovery by malicious agents over the internet.

Figure 1:
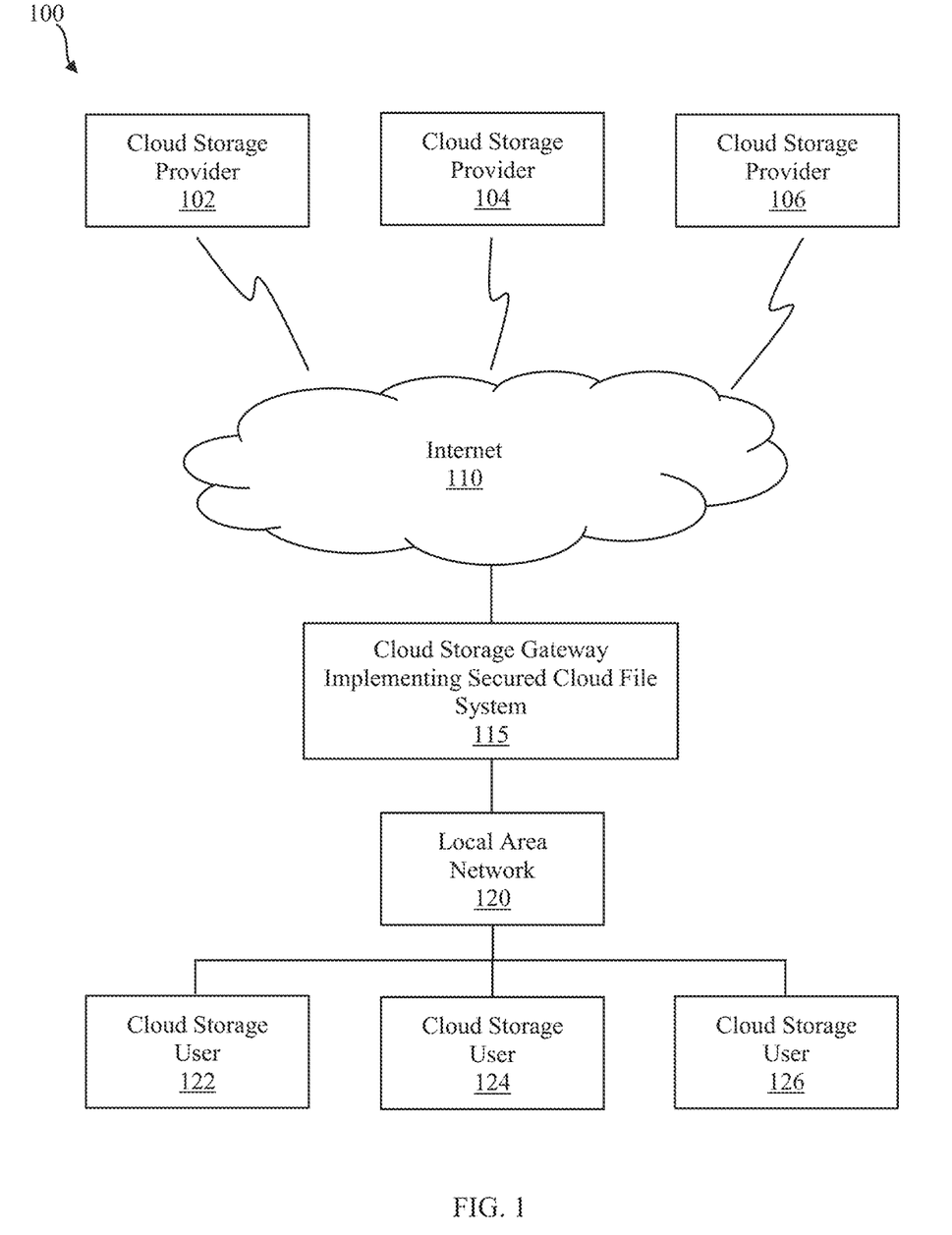
FIG. 1 illustrates an exemplary network architecture incorporating a cloud storage gateway for implementing the secured cloud file system, in accordance with an embodiment of the present invention.

In various embodiments of the present invention, a novel secured cloud file system, which is a dual-layer secured hashing-based file system, is provided to solve the above challenges. FIG. 1 illustrates an exemplary network architecture 100 in accordance with an embodiment of the present invention. System architecture 100 illustrates a cloud stor-

TABLE 1

Search results of cloud folders for organization listed in S&P 100

| Organization name | Cloud folder name | Error message |
| --- | --- | --- |
| Bank of America Corp | https://bofa.s3.amazonaws.com | AccessDenied |
| Citigroup Inc | https://citigroup.s3.amazonaws.com | AccessDenied |
| Goldman Sachs | https://goldmansachs.s3.amazonaws.com | AllAccessDisabled |
| General Motors | https://generalmotors.s3.amazonaws.com | AccessDenied |
| Morgan Stanley | https://morganstanley.s3.amazonaws.com | AllAccessDisabled |
| Wells Fargo | https://wellsfargo.s3.amazonaws.com | AccessDenied |
| Metlife Inc. | https://metlife.s3.amazonaws.com | AccessDenied |
| CVS Health | https://cvshealth.s3.amazonaws.com | AccessDenied |
| United Health | https://unitedhealth.s3.amazonaws.com | AccessDenied |
| Capital One Financial Corp | https://capitalonefinancial.s3.amazonaws.com | AccessDenied | age gateway 115 implementing the secured cloud file system of the present invention that is in communication with a plurality of cloud storage providers 102, 104, 106 and a plurality of cloud storage users 122, 124, 125.

The cloud storage users 122, 124, 125 may utilize data, which includes files and folders. Cloud storage users 122, 124, 125 may upload files, download files search for files or content therein when desired. During a storage operation, the cloud storage users 122, 124, 125 may send a copy of the data, files and/or folders to one or more of the cloud storage providers 102, 104, 106 utilizing the cloud storage gateway 115.

The cloud storage providers 102, 104, 106 provide accounts for the cloud storage users which allows the users access to hundreds or more gigabytes of online storage. Cloud storage providers 102, 104, 106 typically provide distributed storage resources, high fault tolerance via redundancy and/or distribution of data and high durability through the creation of versioned copies. Examples of cloud storage providers include, but are not limited to, DropBox, Google Drive and Amazon Web Services.

The cloud storage gateway 115 typically acts as an interface between the cloud storage users 122, 124, 125 and the cloud storage providers 122, 124, 125, wherein different file storage and access requests received from the cloud storage clients are handled by the cloud storage gateway 115 to identify the appropriate set of folders that need to be accessed for processing the requests. The cloud storage gateway 115 may incorporate multiple functional modules to facilitate transactions between the cloud storage users 122, 124, 125 and the cloud storage providers 122, 124, 125, including but not limited to, a policy assignment module, a generalized API module, a management module, an encryption module and a storage module.

The cloud storage gateway 115 may be in communication with the plurality of cloud storage providers 102, 104, 106 via the Internet and the cloud storage gateway 115 may be in communication with the cloud storage users 122, 124, 126 via a local area network. In general, in the present invention, the cloud storage gateway 115 is interposed between one or more cloud storage providers 102, 104, 106 and one or more cloud storage users 122, 124, 126. Unlike the conventional approach, which relies on protecting passwords using hashing techniques, the present invention provides a novel framework to protect cloud storage users cloud data storage folders, that are stored at the cloud storage providers, in the case of accidental data leaks, which may be due to human errors. Moreover, the purpose of hashing-based password security is to protect the original password from malicious agent, whereas in the present invention, the dual-layer framework is built to help users securely access cloud data while maintaining the original folder names.

Hashing-based techniques to store passwords is better compared to known plain-text and encryption-based techniques, however, the hashing-based technique is vulnerable to other forms of malicious attacks. First, the malicious agents may use pre-computed hash tables, known as rainbow table attack, to search and find the password. Moreover, there is constant growth in the size of rainbow tables which make even longer passwords vulnerable to this attack.

To reduce the attack using rainbow tables, two approaches are used, often together, to secure the passwords. The hashes are computed iteratively, and the number of iterations is a large number (>100000). In this case, the rainbow table cannot be computed if the number of interactions is not known to the malicious agent. Moreover, it increases the time to compute the hash. Therefore, the number of iterations chosen depends on the application time sensitivity and security. The other technique is to use a salt or a random number which is append to each password before hashing. This technique of using random salt for each password along with iterations to increase the time to prepare the rainbow table is a state-of-the-art security model. This framework has been adapted for use in the secured cloud file system of the present invention.

The most recent standard in the Secured Hash Algorithm (SHA) family of algorithms is SHA-3. It consists of four cryptographic hash functions SHA3-224, SHA3-256, SHA3-384, and SHA3-512 along with two extendible output functions—SHAKE128 and SHAKE256. The prior group of hash functions in the SHA family which is widely used in practice is SHA-2 which consists of SHA-224, SHA-256, SHA-384, SHA-512, SHA-512/224, and SRA-512/256. The number of the dash symbol ("-") in the name of the function represents the length of digest in bits. For example, the length of digest for SHA-224 is 224 bits. Apart from fixed length digest functions, the SHA family of functions also provides an extendable-output function (XOF) whose digest output is user defined. The message digest lengths approved by the Federal Information Processing Standard (FIPS) are 160 bits, 224 bits, 256 bits, 384 bits, and 512 bits, For nonstandard digest length application, extendible-output functions are recommended.

However, the embodiments of the present approach do not suffer from the above referenced password challenges. The secure cloud file system of the present invention is secured in the case of accidental leak of hashes and their corresponding salt. Moreover, there are no keys, which need to be shared with multiple users to access the data, hence, the present approach is inherently multiuser. Furthermore, the approach is compatible with the existing file permission services provided by cloud storage providers who are responsible for user access management.

In various embodiments, the present invention provides a dual-layer hashing based secure cloud file system. The layers are referred to as the "control layer" and the "data layer".

The control layer is responsible for masking (via hashing) the data folder storage name. In one embodiment, hashing is performed using Secured Hashing Algorithm (SHA)-224. Moreover, a random salt is added to the hashing algorithm to reduce the probability of discovering the folder name from the hash. Furthermore, the hashing is enhanced by utilizing multiple iterations (>10000). The hashed name and original name of the folder, along with the salt, and number of iterations is stored in a NoSQL database termed as control layer persistence. The hashed names generated by the control layer are further passed to the data layer.

Figure 2:
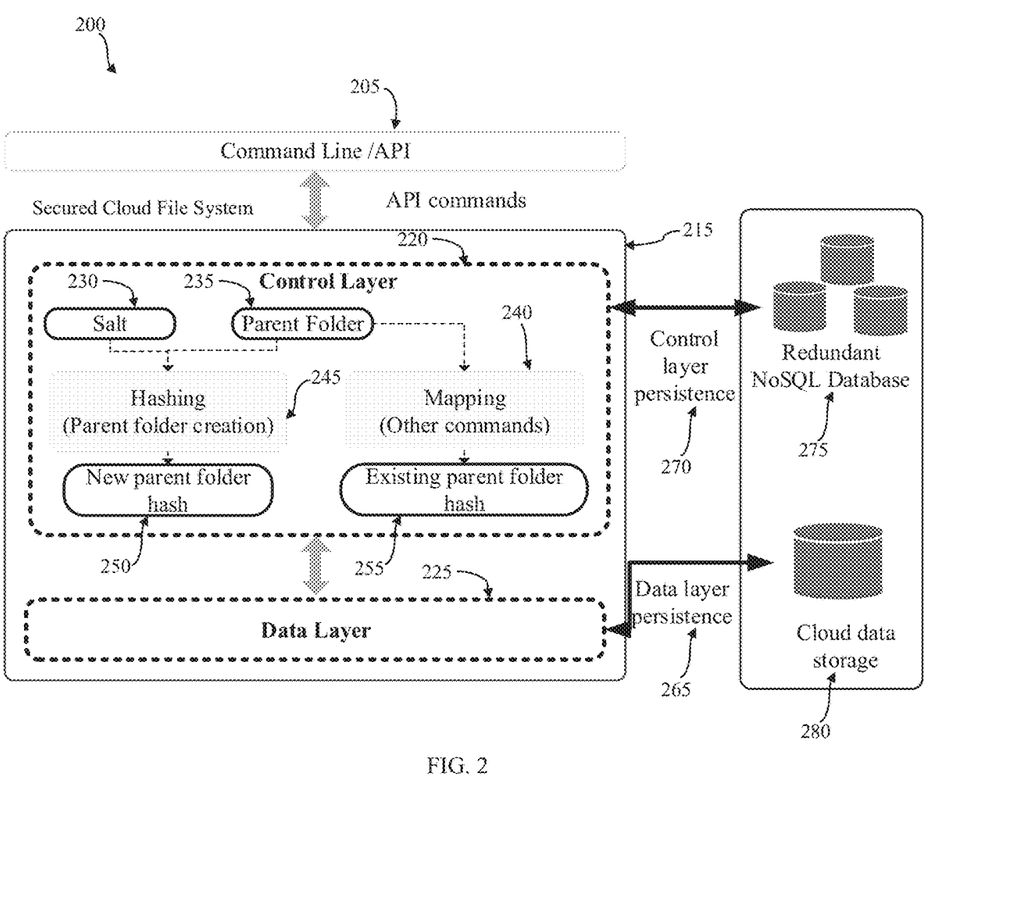
FIG. 2 is a block diagram illustrating the functional blocks of the secured cloud file system, in accordance with an embodiment of the present invention.

An exemplary embodiment of the secured cloud file system framework 215 of the present invention is presented in FIG. 2. The secured cloud file system 215 may be implemented in the cloud storage gateway 115 as previously described with reference to FIG. 1. The secured cloud file system 215 includes a control layer 220 and a data layer 225. The control layer 220 further includes a module for generating the salt 230 to be concatenated with a folder name 235, such as a parent folder name, provided by a cloud storage user that may be received at the secured cloud file system 215 via an API command or command line 205 over a communication interface. Following the concatenation of the salt 230 with the folder name 235, a hashing module 245 of the control layer 220 performs a hashing function to generate a hashed folder name 250. The control layer 220 also stores the salt, the folder name and the number of iterations performed to generate the hashed folder name in a database 275 via a control layer persistence 270. The hashed folder name is then provided to the data layer 225 and the data layer 225 establishes a data layer persistence 265 to persist the hashed folder name at a cloud data storage 280 of a cloud storage provider. The data layer 225 uses the appropriate underlying cloud storage provider services to persist the users' data and other I/O operations.

Prior to creating the hashed folder name from a folder name provided by a cloud storage user, the control layer 220 may receive one or more cloud credentials from the cloud storage user. The cloud credentials may be used to verify that the cloud storage user is allowed access to the data at a particular cloud storage provider.

After the hashed folder name 250 has been created at the cloud data storage 280 and upon receiving a request from a cloud storage user to access a folder name stored at the cloud data storage 280, the control layer 220 of the secured cloud file system 215 accesses the databased 275 to retrieve the salt, the folder name and the number of iterations used to generate the hashed folder name. A mapping module 240 of the control layer 220 is then used to access the existing hashed folder name 255 via the data layer 225 and the data layer persistence 265. The mapping module 240 implements a look-up function which searches for the folder name and the corresponding hashed key for the folder name in the database 275. In general, the data layer 225 is responsible for the persistence of the user data. In the case of any operation, other than the creation of the new folder, a lookup is performed on the control layer persistence 270 to obtain the hashed folder name 255. Additionally, the data layer 225 manages data persistence in the cloud storage/flat file system 280. The data layer 225 receives the hash key corresponding to folder name from the control layer 220 and uses the appropriate underlying cloud services to persist the users' data.

As shown in this embodiment of the secured cloud file system framework 200, the database 275 is implemented as redundant storage for the control layer persistence 270 to reduce the risk of losing the mapping from the folder names to the corresponding hashed folder names. The amount of redundancy depends upon the criticality of the data. In one embodiment the database is a NoSQL database.

Any cryptographic hash function should provide three security properties—collision resistant, second preimage resistant, and preimage resistant. In the present invention, the cloud storage folder name provided by the user via the application interface (APIs) or command line is hashed using a secured hash SHA-224 along with a random 128-bit string, a.k.a. salt. The strength of hashing is improved in the present invention by performing iterative hashing in which the previously generated hash is rehashed. In a particular embodiment, a SHA-224 secure hashing algorithm, along with a 128-byte salt based on the length constraint imposed on the folder name by a cloud provider, which is 63 characters, was used to generate the hashed folder name. During the hashing, the previous digest is rehashed 100,000 times to protect against potential rainbow table attacks. A urandom( ) Python function may be used to generate the salt, however, this is not intended to be limiting and various other methods for generating a random number are within the scope of the present invention. The present approach is better when compared to hashing techniques without salt because it reduces the likelihood of successful brute-force attack. In the case of applications, directly using hashing algorithms such as SHA, a malicious agent can apply brute force techniques in which it checks different likely combi-nations of data and checks with the hash. Moreover, the time required to create a hash of a given string is lower in the case of direct hash functions than secured hashes using hashing, salt, and iterations.

In an exemplary embodiment, hashlib Python library is used to perform the secured hash using hashlib.pbkdf2_hmac( ) function. In this exemplary embodiment, SHA-224 hashing algorithm is chosen due to the limitation of the number of characters which can be used represent a folders' name over the cloud computing platform. However, the framework and algorithms can work on any other hashing algorithm with any changes.

In the exemplary embodiment, a random number generator function was used to generate random salt of 128 bytes suitable for cryptographic use. Using a salt of 128 bytes, approximately $2^{128}$ possible keys can be created for a given storage name. The use of random salt prohibits the malicious agent from using pre-computed hash tables or rainbow tables for determining the name of the cloud folder and makes each hash of each bucket unique, even if they have identical names. Moreover, it also increases the time required to compute the hash for the malicious agent, which further reduces the efficiency of malicious attack. Furthermore, a longer salt of 128 bytes is better than smaller length salt.

The number of hashing iterations is a fixed number that determines how many times the hashing function iterates to generate the key. A minimum iteration count of 100,000 is recommended in the secured cloud file system of the present invention. The output of the key derivation function, the key digest is communicated to the data layer 225 that handles data persistence in the flat file system provided by the cloud storage provider.

Figure 3:
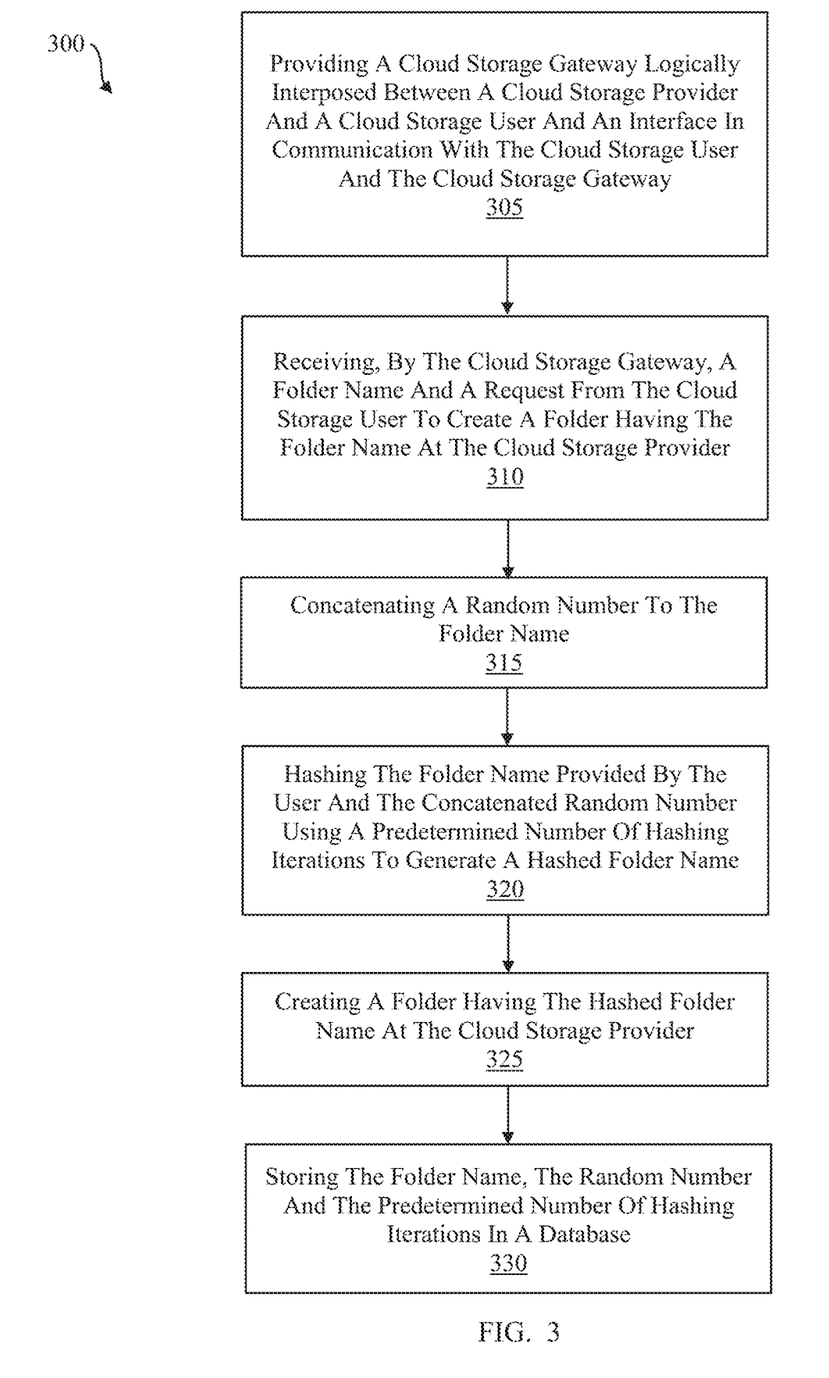
FIG. 3 is a flow diagram illustrating the method steps performed to create a secure hashed folder at a cloud storage provider, in accordance with an embodiment of the present invention.

FIG. 3 is a flow diagram 300 illustrating the method steps performed by the secured cloud file system 215 of the present invention for creating a secured folder at the cloud storage provider. In a first step 305, the cloud storage gateway is provided that is logically interposed between a cloud storage provider and a cloud storage user and an interface is provided in communication with the cloud storage user and the cloud storage gateway. In one embodiment the interface may be an Application Programming Interface (API). At step 310, the cloud storage gateway receives a folder name and a request from a cloud storage user to create a folder having the folder name at the cloud storage provider. At a next step 315, the cloud storage gateway concatenates a random number to the folder name provided by the cloud storage user and then at step 320 performs a predetermined number of hashing iterations using the concatenated random number and to generate a hashed folder name. At step 325, a folder having the hashed folder name is created at the cloud storage provider and at step 330, the folder, the random number and the predetermined number of hashing iterations are stored in a database. As previously described, a control layer 220 of the secured cloud file system 215 implemented in the cloud storage gateway 115 is responsible for the cryptographic hashing and persistence of the folder name, hashed name, random number, and iterations in the database. The control layer 220 communicates with the data layer 225 and provides the hashed folder names to persist the user cloud data storage 280 at one or more of the cloud storage providers.

Figure 4:
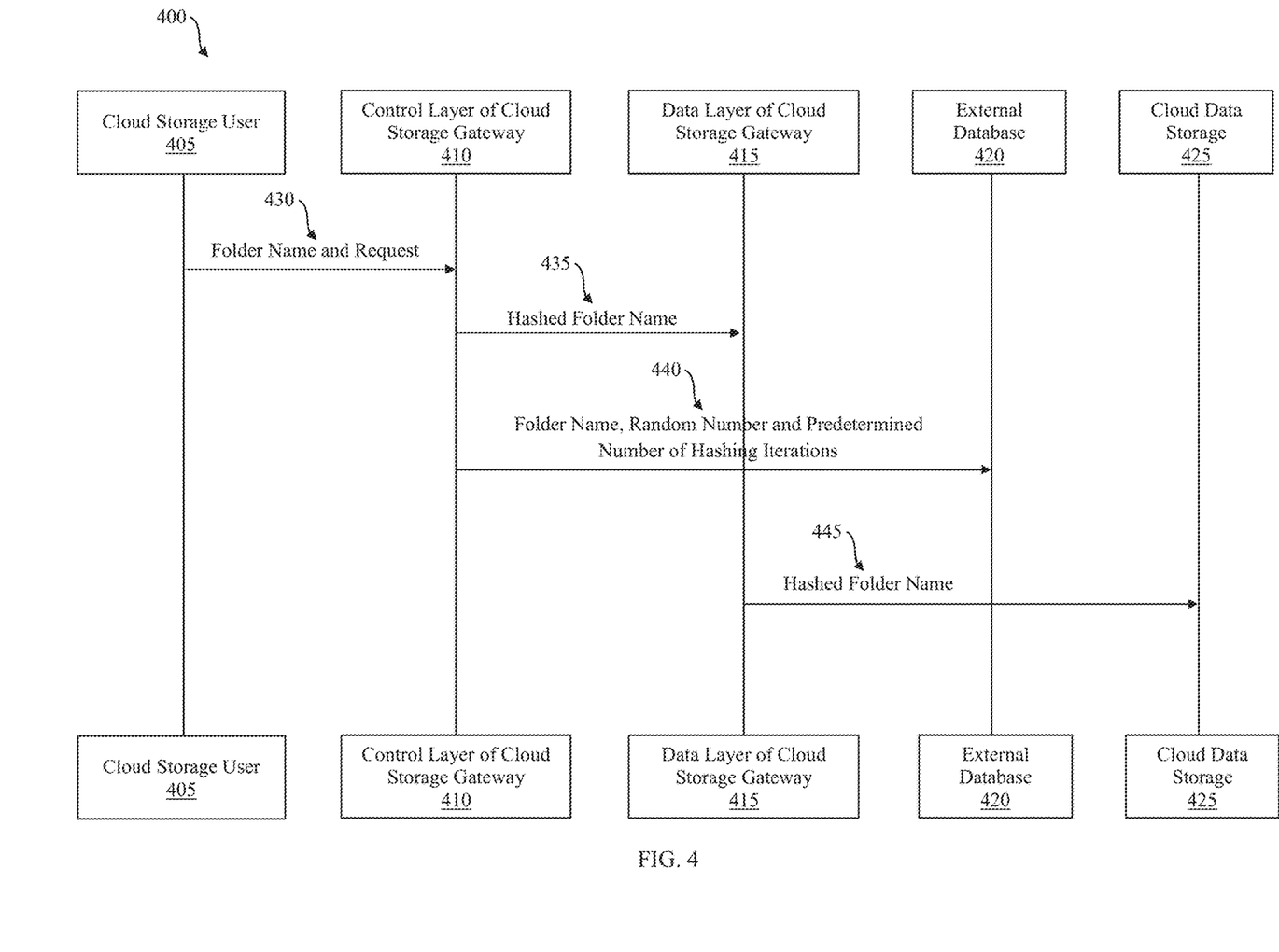
FIG. 4 is a sequence diagram for creating a secure hashed folder at a cloud storage provider, in accordance with an embodiment of the present invention.

FIG. 4 illustrates a sequence diagram 400 for creating a secure hashed folder at a cloud storage provider, in accordance with an embodiment of the present invention. As can be seen, a cloud storage user 405 provides a folder name and a request 430 to a control layer of the cloud storage gateway

410. The control layer of the cloud storage gateway 410 generates the hashed folder name and provides the hashed folder name 435 to the data layer of the cloud storage gateway 415. The control layer of the cloud storage gateway 410 also persists the folder name, and the random number and the predetermined number of hashing iterations used to generate the hashed folder name 440 at an external database 420. The data layer of the cloud storage gateway 415 then persists the hashed folder name at the cloud data storage 425 of the cloud storage provider.

Figure 5:
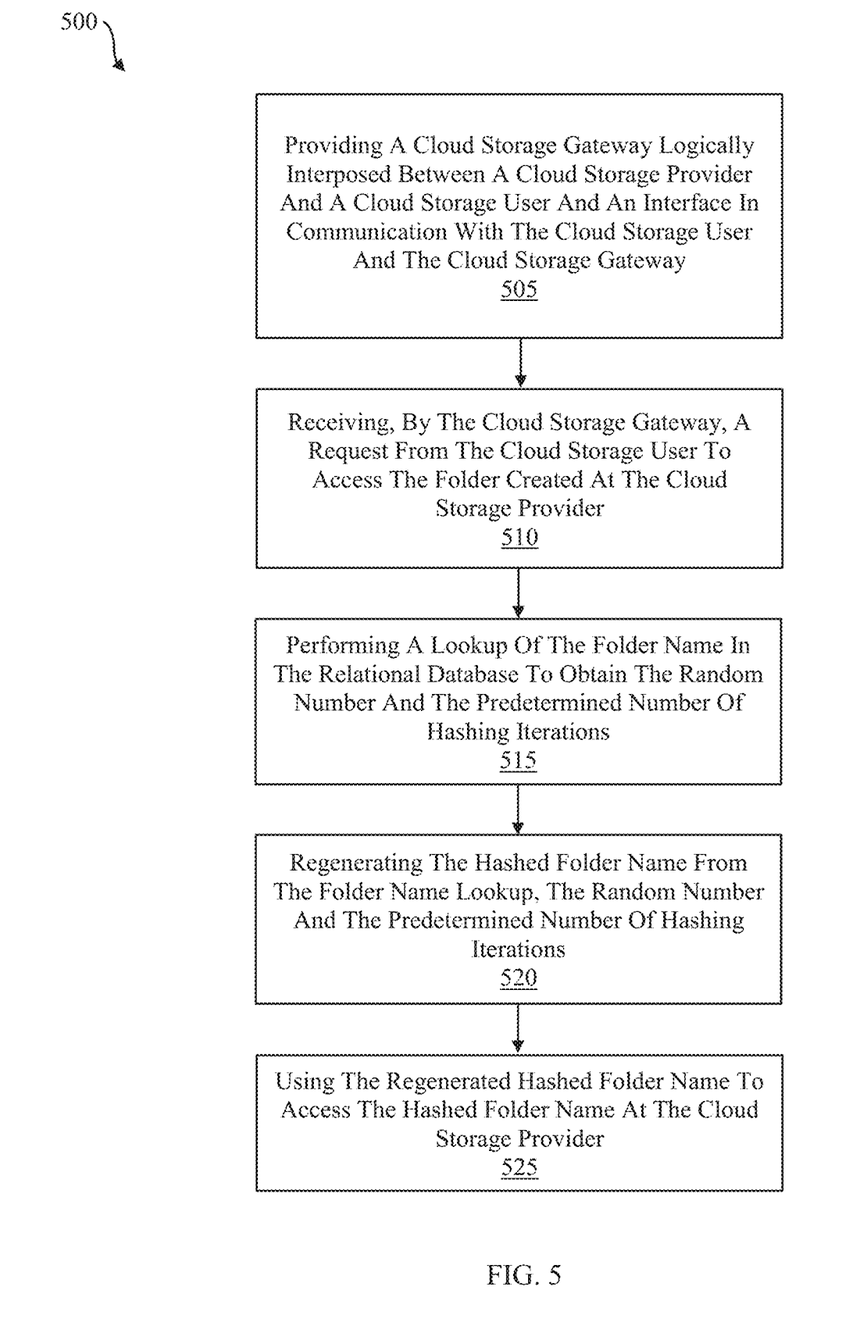
FIG. 5 is a flow diagram illustrating the method steps performed to access a secure hashed folder at a cloud storage provider, in accordance with an embodiment of the present invention.

FIG. 5 is a flow diagram 500 illustrating the method steps performed by the secured cloud file system 215 of the present invention for access a secured folder previously created at the cloud storage provider. In a first step 505, the cloud storage gateway is provided that is logically interposed between a cloud storage provider and a cloud storage user and an interface is provided in communication with the cloud storage user and the cloud storage gateway. In one embodiment the interface may be an Application Programming interface (API). At step 510, the cloud storage gateway receives a folder name and a request from a cloud storage user to access the folder having the folder name at the cloud storage provider. At step 515, a lookup is performed in the database to obtain the random number and the predetermined number of hashing iterations and at step 520, the hashed folder name is regenerated from this lookup. At step 525, the regenerated hashed folder name is then used to access the hashed folder name at the cloud storage provider.

Figure 6:
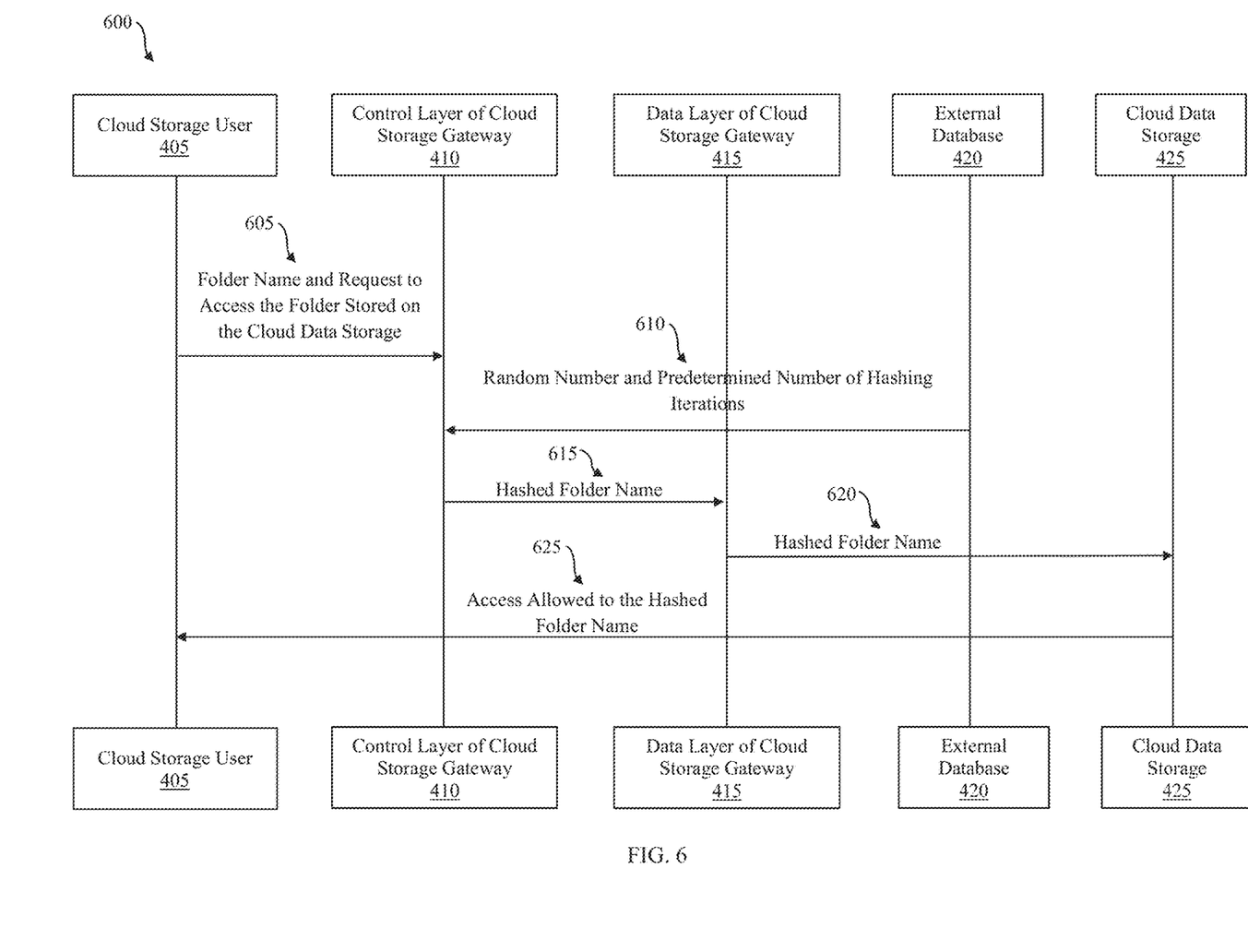
FIG. 6 is a sequence diagram for accessing a secure hashed folder at a cloud storage provider, in accordance with an embodiment of the present invention

FIG. 6 illustrates a sequence diagram 600 for accessing a secure hashed folder at a cloud storage provider, in accordance with an embodiment of the present invention. As can be seen, a cloud storage user 405 provides a folder name and an access request 605 to a control layer of the cloud storage gateway 410. The control layer of the cloud storage gateway 410 retrieves the random number of the predetermined number of hashing iterations 610 from the external database 420 and regenerates the hashed folder name 615. The control layer of the cloud storage gateway 410 then provides the hashed folder name 615 to the data layer of the cloud storage gateway 415. The data layer of the cloud storage gateway 415 provides the hashed folder name to the cloud data storage 425 at the cloud storage provider, thereby providing the cloud storage user 405 access to the hashed folder name 625.

In a particular embodiment, the proposed secured cloud file system has Teen implemented and integrated with Amazon AWS for the proof-of-concept to demonstrate that there is no additional overhead in terms of usability of the secured cloud file system over the existing system currently known in the art.

In summary, the present invention provides a novel cloud security framework to protect users' data in the case of accidental leaks in the cloud computing environment. In an exemplary embodiment of the proposed framework, secured hashing of parent folders' names of the data storage using multiple iterations of state-of-the-art cryptographic hash function (SHA-224) is performed, along with random salt of 128-bits for each of the folder names to provide security against most recent security vulnerability, including rainbow table attack. The proposed system is a dual-layer framework consisting of a control layer and a data layer. The control layer is responsible for cryptographic hashing and persistence of the folder name, hashed name, salt, and iterations in the control layer persistence using a non-relational database. The control layer communicates with the data layer and provides the hashed folder name to persist the user data cloud storage.

In order to implement the secured cloud file system framework, novel algorithms have been developed for different cloud operations to access the data. These include creating folder, deleting folder, listing folder, copying content from one folder to another folder, copying from a cloud folder to an external system outside the cloud environment.

Accordingly, the present invention provides a novel framework and an artifact to reduce the likelihood of discovery of confidential data leaks in the case of accidental exposure of sensitive cloud storage data. The novel approach enhances the security of private data folders by masking the names of the cloud storage folders using state-of-art hashing, salt, and iterations. Additionally, novel algorithms are provided to access data in the proposed framework. The solution is a cloud-based system, which can easily scale based on organizational growth and business demand. The solution also provides protection against insider leaks in the case of incorrect access policies.

The proposed approach increases a minimal overhead in terms of computing and access time to retrieve data compared to existing systems due to hashing and lookup. However, users can tradeoff between the hashing overhead and access time by selecting different hashing algorithms. The secured cloud file system framework is compatible with different hashing algorithms.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method for providing a secured cloud file system, the method comprising:
   providing a cloud storage gateway logically interposed between a cloud storage provider and a cloud storage user and an interface in communication with the cloud storage user and the cloud storage gateway; and
   responsive to receiving, by the cloud storage gateway, a folder name and a request from the cloud storage user to create a folder having the folder name at the cloud storage provider:
      concatenating a random number to the folder name;
      hashing the folder name provided by the user and the concatenated random number using a predetermined number of hashing iterations to generate a hashed folder name;
      creating a folder having the hashed folder name at the cloud storage provider; and
      storing the folder name, the random number and the predetermined number of hashing iterations in a database.

2. The method of claim 1, further comprising:
   responsive to receiving, by the cloud storage gateway, a request from the cloud storage user to access the folder created at the cloud storage provider:
      performing a lookup of the folder name in the relational database to obtain the random number and the predetermined number of hashing iterations;
      regenerating the hashed folder name from the folder name lookup, the random number and the predetermined number of hashing iterations; and
      using the regenerated hashed folder name to access the hashed folder name at the cloud storage provider.

3. The method of claim 2, wherein the request from the cloud storage user to access the folder created at the cloud storage provider includes one or more of, deleting the folder, listing the folder, accessing content of the folder, copying content of the folder to another folder, copying content of the folder to an external system.

4. The method of claim 1, wherein the folder is a parent folder or a subfolder.

5. The method of claim 1, further comprising verifying, by the cloud storage gateway, that the cloud storage user possesses the necessary credentials to access the cloud storage provider.

6. The method of claim 1, wherein the database is selected from a relational database and a non-relational database.

7. The method of claim 1, wherein storing the folder name, the random number and the predetermined number of hashing iterations in a database, further comprises storing redundant copies of the folder name, the random number and the predetermined number of hashing iterations in the database.

8. The method of claim 1, wherein hashing the folder name is performed using a Secured Hashing Algorithm (SHA).

9. The method of claim 1, where the interface is selected from a command line and an application programming interface (API).

10. A secured cloud file system, the system comprising:
   one or more processors interposed between a cloud storage provider and a cloud storage user;
   a communication interface operatively coupled to the one or more processors and the cloud storage user;
   one or more data storage devices operatively coupled to the one or more processors and storing:
      a control layer, which when executed on the one or more processors, and responsive to receiving a folder name and a request from the cloud storage user to create a folder having the folder name at the cloud storage provider, concatenates a random number to the folder name, hashes the folder name provided by the cloud storage user and the concatenated random number using a predetermined number of hashing iterations to generate a hashed folder name and stores the folder name, the random number and the predetermined number of hashing iterations in a database; and
      a data layer, which when executed on the one or more processors, creates a folder having the hashed folder name at the cloud storage provider.

11. The system of claim 10, further comprising:
   the control layer, which when executed on the one or more processors, and responsive to receiving a request from the cloud storage user to access the folder created at the cloud storage provider, performs a lookup of the folder name in the relational database to obtain the random number and the predetermined number of hashing iterations, regenerates the hashed folder name from the folder name lookup, the random number and the predetermined number of hashing iterations and uses the regenerated hashed folder name to access the hashed folder name at the cloud storage provider.

12. The system of claim 11, wherein the request from the cloud storage user to access the folder created at the cloud storage provider includes one or more of, deleting the folder, listing the folder, accessing content of the folder, copying content of the folder to another folder, copying content of the folder to an external system.

13. The system of claim 10, wherein the folder is a parent folder or a subfolder.

14. The system of claim 10, further comprising the control layer, which when executed on the one or more processors, and responsive to receiving a folder name and a request from the cloud storage user to create a folder having the folder name at the cloud storage provider, verifying that the cloud storage user possesses the necessary credentials to access the cloud storage provider.

15. The system of claim 10, wherein the database is selected from a relational database and a non-relational database.

16. The system of claim 10, wherein storing the folder name, the random number and the predetermined number of hashing iterations in a database, further comprises storing redundant copies of the folder name, the random number and the predetermined number of hashing iterations in the database.

17. The system of claim 10, wherein hashing the folder name is performed using a Secured Hashing Algorithm (SHA).

18. A non-transitory computer-readable storage media embodying a set of instructions, which when executed by one or more processors of a cloud storage gateway logically interposed between a cloud storage provider and a cloud storage user, cause the one or more processors to perform a method comprising:
   providing an interface between the cloud storage gateway and the cloud storage user;
   responsive to receiving, by the cloud storage gateway, a folder name and a request from the cloud storage user to create a folder having the folder name at the cloud storage provider:
      concatenating a random number to the folder name;
      hashing the folder name provided by the user and the concatenated random number using a predetermined number of hashing iterations to generate a hashed folder name;
      creating a folder having the hashed folder name at the cloud storage provider; and
      storing the folder name, the random number and the predetermined number of hashing iterations in a database.

19. The non-transitory computer-readable storage medium of claim 18, wherein the method further comprises:
   responsive to receiving, by the cloud storage gateway, a request from the cloud storage user to access the folder created at the cloud storage provider:
      performing a lookup of the folder name in the relational database to obtain the random number and the predetermined number of hashing iterations;
      regenerating the hashed folder name from the folder name lookup, the random number and the predetermined number of hashing iterations; and
      using the regenerated hashed folder name to access the hashed folder name at the cloud storage provider.

20. The non-transitory computer-readable storage medium of claim 19, wherein the request from the cloud storage user to access the folder created at the cloud storage provider includes one or more of, deleting the folder, listing the folder, accessing content of the folder, copying content of the folder to another folder, copying content of the folder to an external system.

* * * * *